United States Patent
Hong

(10) Patent No.: US 9,814,013 B2
(45) Date of Patent: Nov. 7, 2017

(54) METHODS, SYSTEMS, AND PRODUCTS FOR DETERMINATION OF DOMINANT BASE STATIONS

(71) Applicant: AT&T Intellectual Property I, L.P., Atlanta, GA (US)

(72) Inventor: Olivia Hong, Bridgewater, NJ (US)

(73) Assignee: AT&T INTELLECTUAL PROPERTY I, L.P., Atlanta, GA (US)

(\*) Notice: Subject to any disclaimer, the term of this patent is extended or adjusted under 35 U.S.C. 154(b) by 11 days.

(21) Appl. No.: 14/072,444

(22) Filed: Nov. 5, 2013

(65) Prior Publication Data

US 2015/0126148 A1    May 7, 2015

(51) Int. Cl.
| | | |
|---|---|---|
| H04M 11/00 | (2006.01) | |
| H04W 64/00 | (2009.01) | |
| H04W 4/02 | (2009.01) | |
| H04W 4/00 | (2009.01) | |
| H04W 4/20 | (2009.01) | |

(52) U.S. Cl.
CPC .............. *H04W 64/00* (2013.01); *H04W 4/02* (2013.01); *H04W 4/00* (2013.01); *H04W 4/206* (2013.01)

(58) Field of Classification Search
CPC ...................................................... H04W 8/04
See application file for complete search history.

(56) References Cited

U.S. PATENT DOCUMENTS

| | | | |
|---|---|---|---|
| 5,519,760 A | 5/1996 | Borkowski et al. | |
| 6,044,261 A | 3/2000 | Kazmi | |
| 7,035,647 B2 | 4/2006 | de Verteuil | |
| 7,254,388 B2 | 8/2007 | Nam et al. | |
| 8,010,134 B2 | 8/2011 | Barnes et al. | |
| 8,340,633 B1* | 12/2012 | Rege | H04W 4/26 455/405 |
| 8,504,070 B2 | 8/2013 | Dowlatkhah | |
| 2002/0161633 A1 | 10/2002 | Jacob et al. | |
| 2004/0266406 A1 | 12/2004 | Meda | |
| 2006/0293065 A1 | 12/2006 | Chew et al. | |
| 2009/0149154 A1* | 6/2009 | Bhasin | H04M 15/00 455/406 |
| 2010/0004997 A1 | 1/2010 | Mehta et al. | |
| 2010/0015926 A1* | 1/2010 | Luff | H04L 41/0604 455/67.13 |
| 2010/0223135 A1 | 9/2010 | Griffin et al. | |
| 2011/0059763 A1* | 3/2011 | Yoshiuchi | H04W 52/0216 455/522 |
| 2012/0238287 A1* | 9/2012 | Scherzer | H04W 48/16 455/456.1 |

OTHER PUBLICATIONS

Halepovic, Emir, and Carey Williamson. "Characterizing and modeling user mobility in a cellular data network." *Proceedings of the 2nd ACM international workshop on Performance evaluation of wireless ad hoc, sensor, and ubiquitous networks*. ACM, 2005.

\* cited by examiner

*Primary Examiner* — Idowu O Osifade
(74) *Attorney, Agent, or Firm* — Scott P. Zimmerman, PLLC

(57) ABSTRACT

Methods, systems, and products determine home locations of mobile devices. Times of usages of network base stations are summed to determine a dominant base station that is frequently used by a mobile device. The dominant base station is assigned as a home location for the mobile device.

20 Claims, 12 Drawing Sheets

METHODS, SYSTEMS, AND PRODUCTS FOR DETERMINATION OF DOMINANT BASE STATIONS

NOTICE OF COPYRIGHT PROTECTION

A portion of the disclosure of this patent document and its figures contain material subject to copyright protection. The copyright owner has no objection to the facsimile reproduction by anyone of the patent document, but otherwise reserves all copyrights whatsoever.

BACKGROUND

Conventional mobile advertising is based on location. An advertisement is associated with some location. When a mobile device enters the matching location, the advertisement is sent to the mobile device. This location-based advertising, however, is often ineffective. Many mobile devices have no affinity to their current location. That is, the current location of a mobile device often has no relation to a subscriber's home location. Subscribers may travel throughout the world, yet only advertisements in their home location may be effective.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
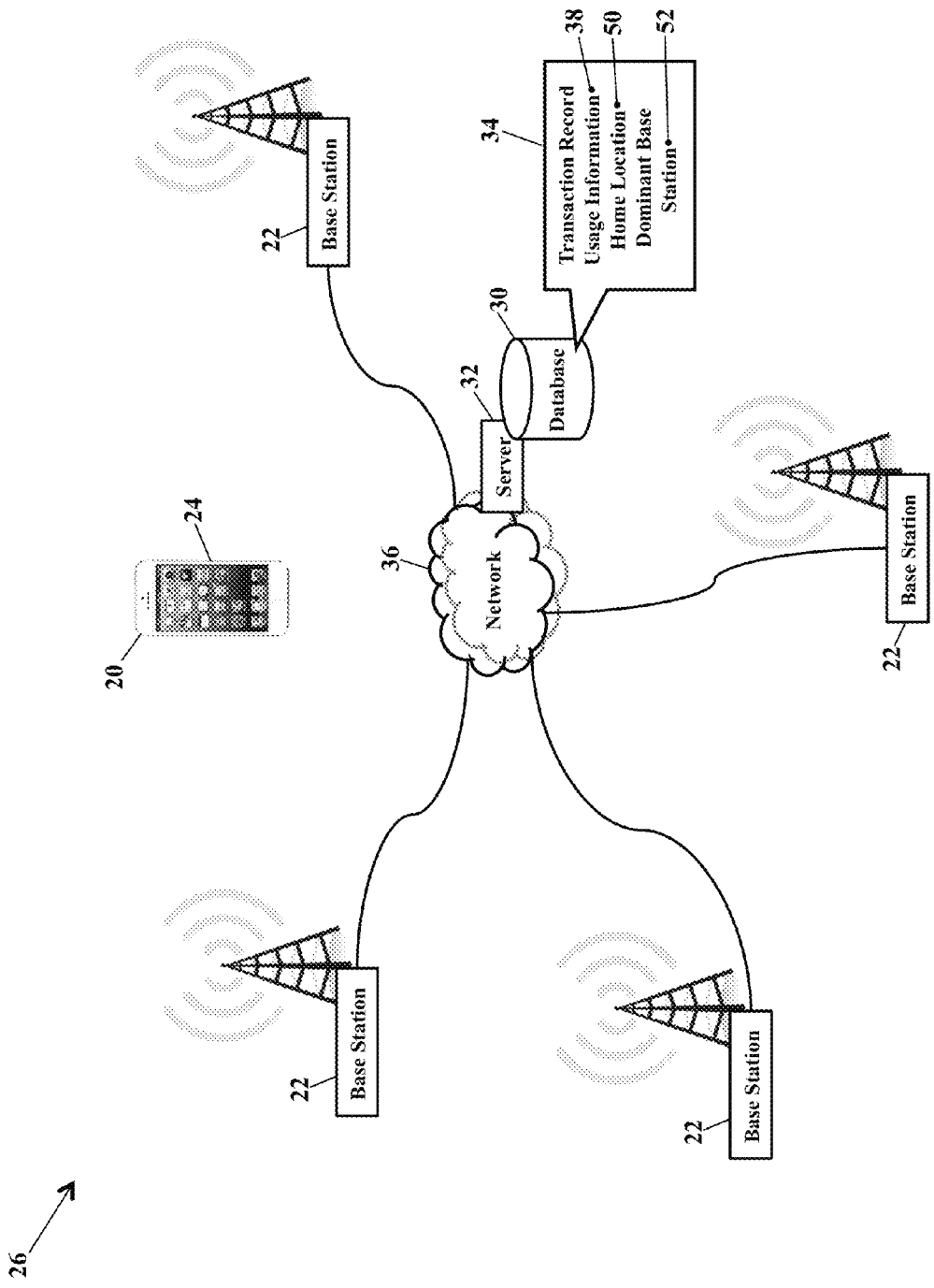
FIGS. 1-3 are simplified schematics illustrating an environment in which exemplary embodiments may be implemented.
Figure 2:
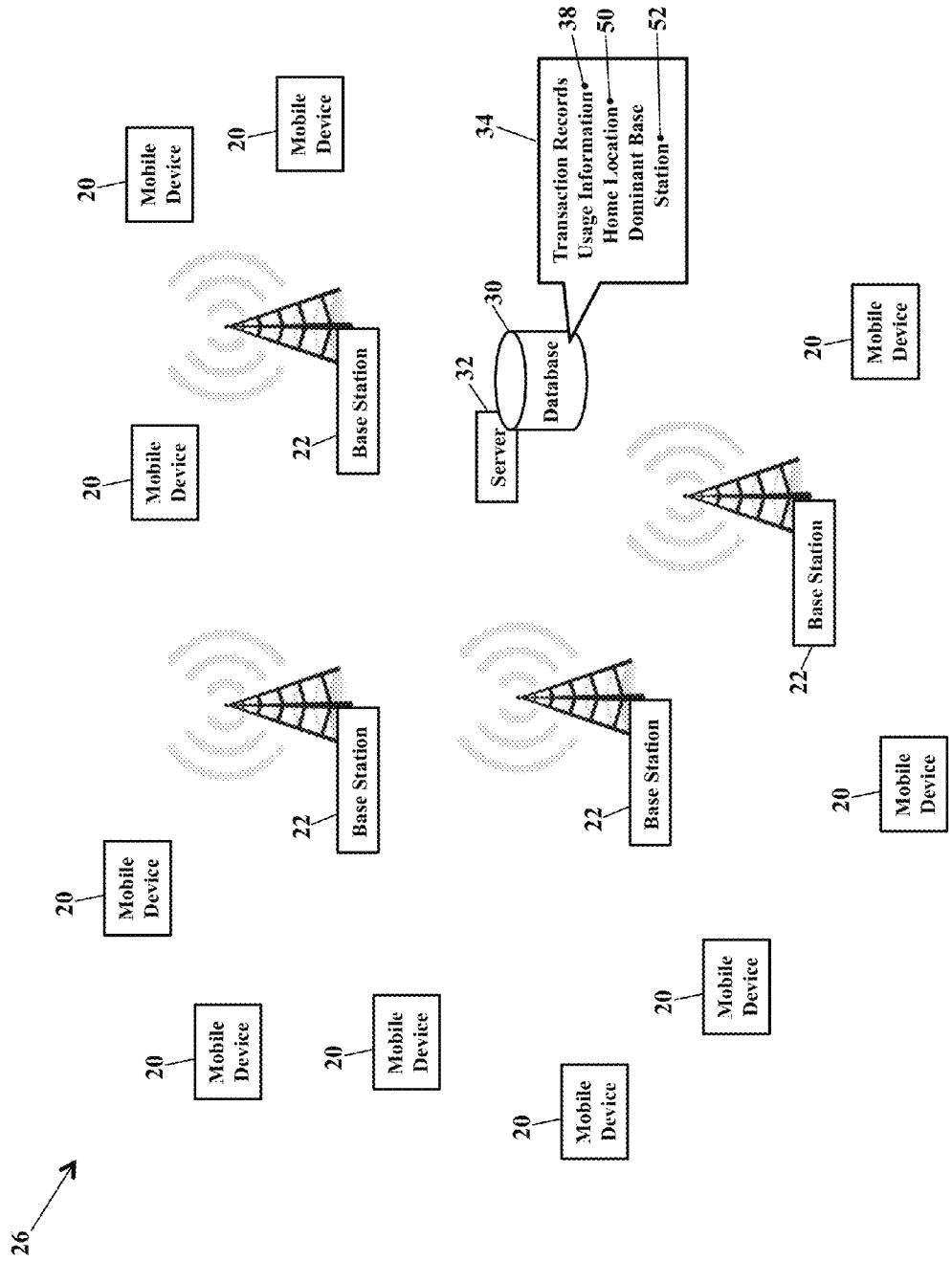
Figure 3:
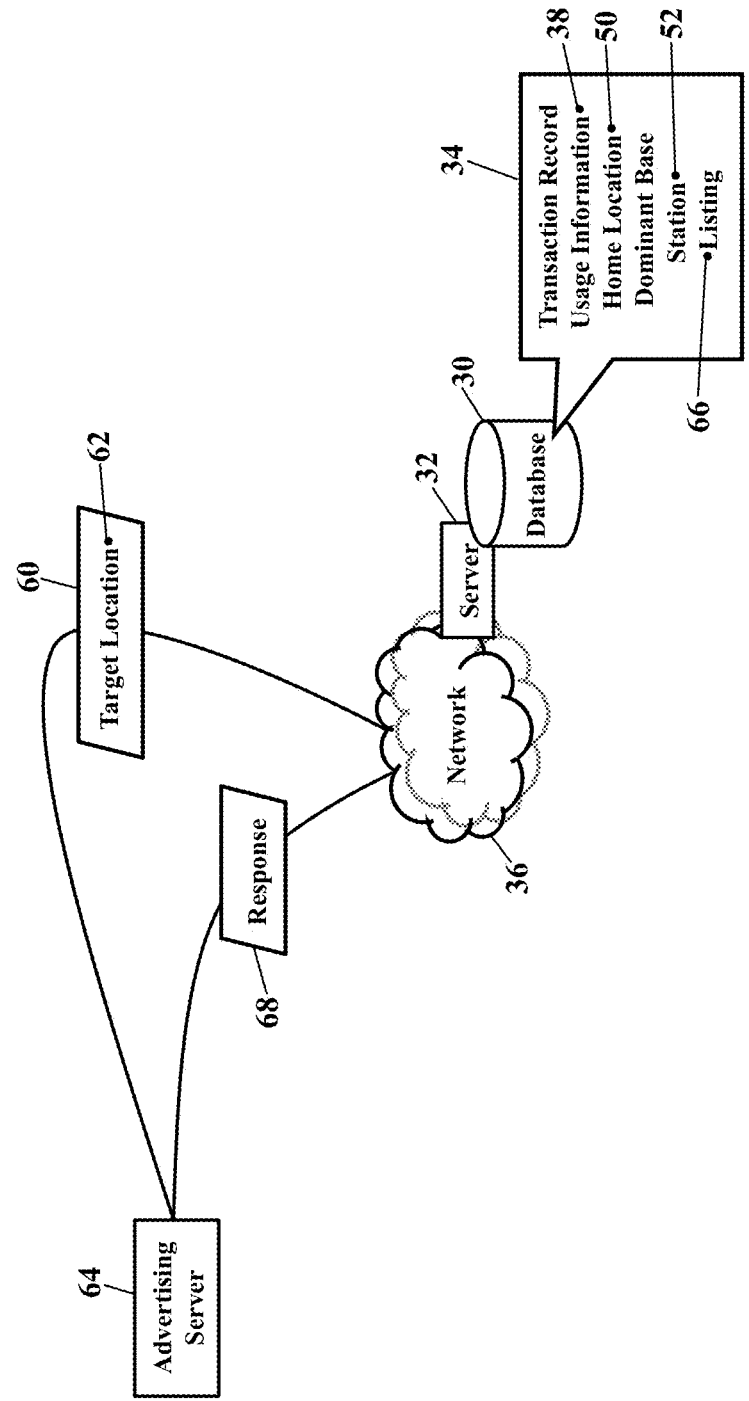

FIGS. 1-3 are simplified schematics illustrating an environment in which exemplary embodiments may be implemented. As a mobile device 20 travels, the mobile device 20 establishes communications with one or more cellular base stations 22. The mobile device 20 is illustrated as smartphone 24, but the mobile device 20 may be any processor-controlled device (as later paragraphs will explain). As the reader may understand, as the mobile device 20 transmits and receives signals, the mobile device 20 may traverse many different cells in a cellular network 26. So, as the mobile device 20 moves within the cellular network 26, hand-off occurs. The mobile device 20 is switched to the radio channel of a neighboring cellular base station 22. Because the operation of the cellular network 26 is well known, its operation need not be explained in detail.

As the mobile device 20 journeys, records are maintained. As FIG. 1 illustrates, a central database 30 stores records of each base station 22 that establishes communication with the mobile device 20. The central database 30 is stored in memory of a server 32. As the mobile device 20 makes voice calls, sends data, or receives data, the central database 30 records a transaction record 34. Each cellular base station 22 has a wired or wireless interface with a data network 36. When the mobile device 20 uses voice or data services from any one of the cellular base stations 22, usage information 38 is sent to the network address of the server 32. The server 32 stores the usage information 38 as the transaction record 34 in the database 30. Over time, then, the database 30 stores an historical log of the usage information 38 associated with the mobile device 20.

A home location 50 may then be determined. As the mobile device 20 is used, over time the database 30 stores an historical log of the usage information 38 associated with the mobile device 20. Indeed, the database 30 may store years of transaction records 34 associated with the mobile device 20. Exemplary embodiments may thus analyze the usage information 38 to determine the home location 50 of the mobile device 20. For example, exemplary embodiments track all the different cellular base stations 22 that send/receive data to/from the mobile device 20. Exemplary embodiments may also monitor all the different cellular base stations 22 that handle voice calls for the mobile device 20. Over time, some of the different cellular base stations 22 will conduct more frequent, cumulative usage than others. Indeed, when the usages are ranked, a single one of the cellular base stations 22 may even dominate the usage. High-ranking base stations 22, and/or a dominant cellular base station 52, may be designated as the user's home location 50.

The home location 50 may be used for advertising. The home location 50 is the geographical location at which the user (of the mobile device 20) likely resides. The dominant cellular base station 52, in other words, is likely near where the user resides. The home location 50 is thus the geographical location that is most likely to have an appeal or affinity with the user's purchasing decisions. Exemplary embodiments may thus tally the mobile phone's usage habits of the cellular base stations 22. When a targeted advertisement is sent, exemplary embodiments may send the advertisement to the mobile device's home location 50.

FIG. 2 expands the database 30 to populations of mobile devices 20. As the reader likely knows, many people carry and use their mobile device 20. Indeed, in metropolitan areas, thousands or even millions of people may carry smartphones, cellphones, tablet computers, pagers, and many other mobile devices 20. As all these mobile devices 20 may interact with the cellular network 26, exemplary embodiments may track the individual usage information 38 for each different mobile device 20. All this usage is reported to the central database 30. The central database 30 may thus store the transaction records 34 for all the different mobile devices 20 that utilize the cellular network 26. The transaction records 34 may be analyzed to determine the most likely home location 50 for each mobile device 20. Each mobile device's home location 50 may then be used for targeted advertising.

FIG. 3 illustrates a targeted advertising campaign. Once the database 30 is built, the database 30 may be used for advertising. As FIG. 3 illustrates, the server 32 may receive a query 60 specifying a target location 62. For simplicity, FIG. 3 illustrates the query 60 originating from an advertising server 64. The query 60, of course, may originate from any device communicating with the data network 36. Regardless, the query 60 requests all the mobile devices having some affinity with the target location 62. The server 32 queries the database 30 for the target location 62. The server 32 retrieves a listing 66 of all the mobile devices 20 associated with the target location 62. Here, though, exemplary embodiments may retrieve some or all of the mobile devices 20 having the high ranking base stations 22, and/or the dominant base station 52, that matches the target location 62. The server 32 sends the listing 66 as a response 68 to the query 60.

Figure 4:
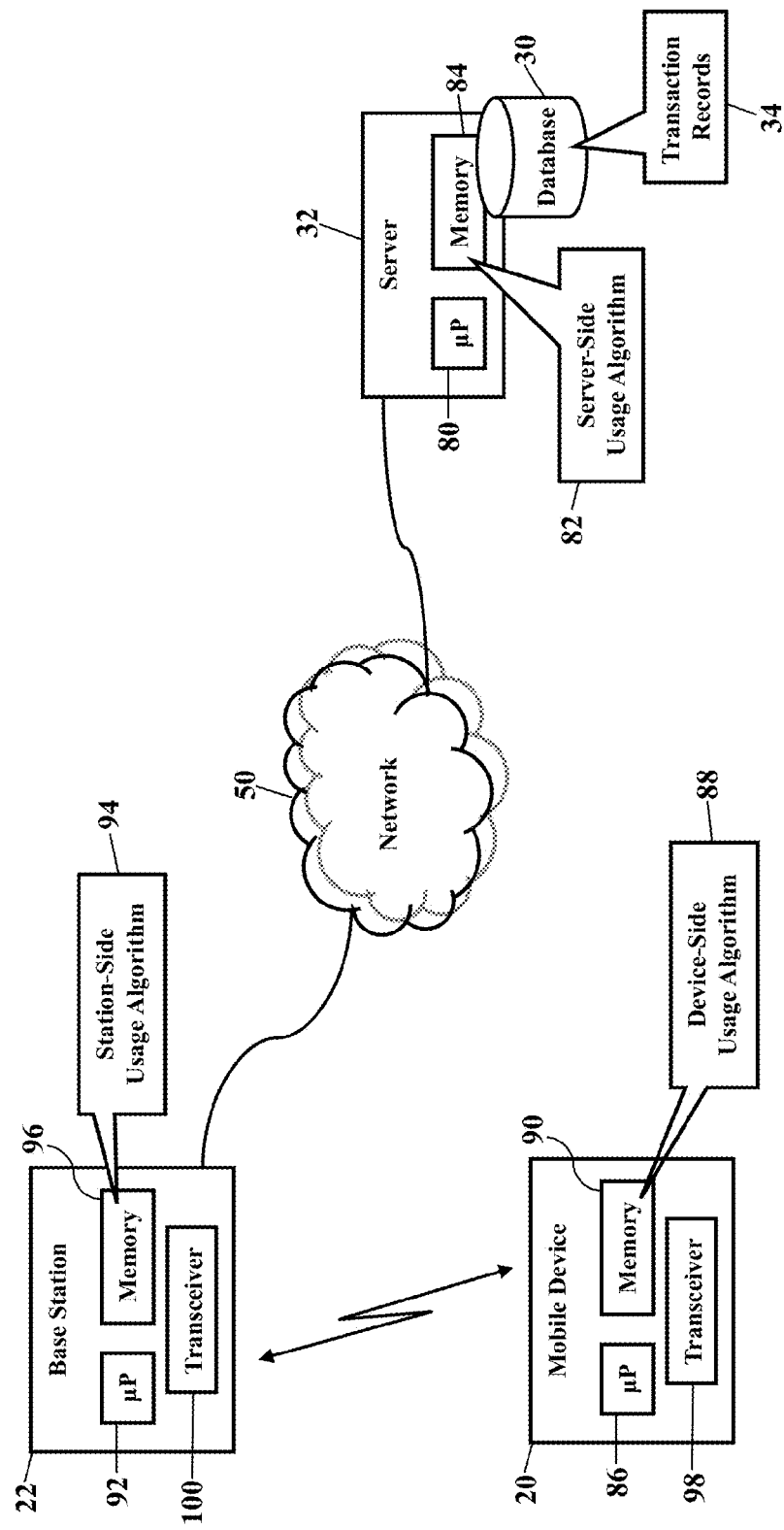
FIGS. 4-5 are more detailed schematic illustrating an operating environment, according to exemplary embodiments.
Figure 5:
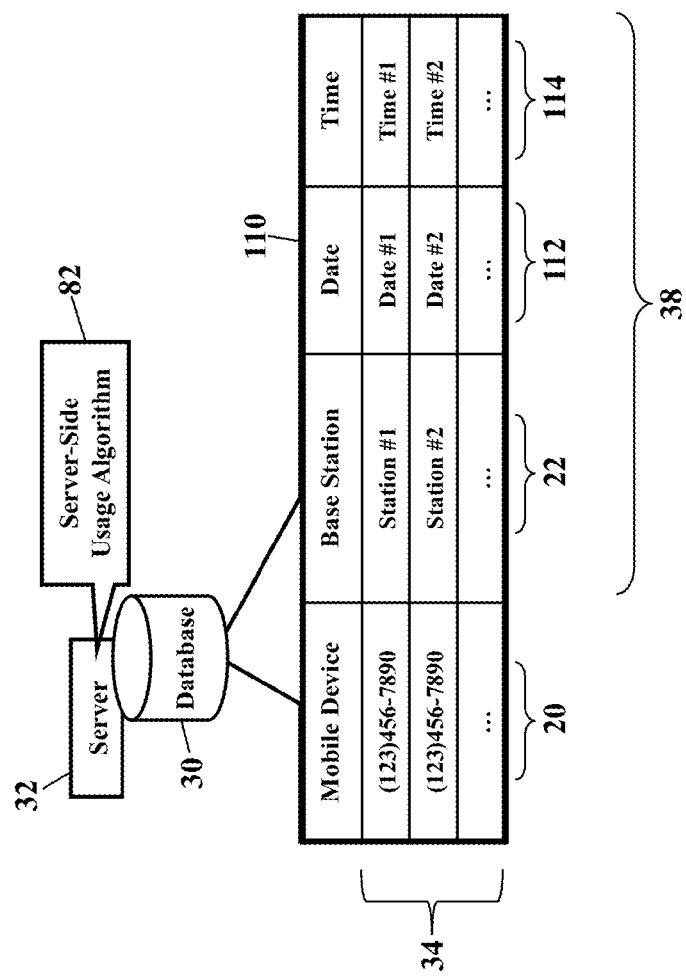

FIGS. 4-5 are more detailed schematic illustrating an operating environment, according to exemplary embodiments. The server 32 has a processor 80 (e.g., "μP"), application specific integrated circuit (ASIC), or other component that executes a server-side usage algorithm 82 stored in a memory 84. The mobile device 20 may also have a processor 86 (e.g., "μP"), application specific integrated circuit (ASIC), or other component that executes a device-side usage algorithm 88 stored in a memory 90. The base station 22 may also have a processor 92 (e.g., "μP"), application specific integrated circuit (ASIC), or other component that executes a station-side usage algorithm 94 stored in a memory 96. The mobile device 20 and the base station 22 may each have transceivers 98 and 100 for wireless transmission and reception. The server-side usage algorithm 82, the device-side usage algorithm 88, and the station-side usage algorithm 94 may thus be instructions, code, and/or programs that cooperate to record the transaction records 34 stored in the database 30. Each time the mobile device 20 accesses (or "touches") the base station 22, the transaction record 34 may be sent to the server 32.

FIG. 5 illustrates the database 30. The database 30 is illustrated as a table 110 having entries that store the transaction records 34. Each entry maps, relates, or otherwise associates the mobile device 20 to the base station 22 recording the usage information 38. The mobile device 20 may be uniquely identified with a telephone number or Internet Protocol address, electronic serial number (ESN), mobile identification number (MIN), or any other alphanumeric identifier. Each base station 22 may also be uniquely identified using any alphanumeric identifier. The usage information 28 may be documented with any information that helps determine a data or a cellular customer's habits. FIG. 5, for simplicity, illustrates a date 112 and time 114 of the usage. The usage information 38, however, may be far more detailed, such as logging numbers called, calls received, minutes talked, data used (bits), websites requested or downloaded, and networks accessed.

Exemplary embodiments may be applied regardless of networking environment. Any networking technology may be used to establish communication between the mobile device 20, the base station 22, and the server 32. The cellular network 26, for example, may be a wireless network utilizing any signaling standard (such as the IEEE 802 family of standards, GSM/CDMA/TDMA or any cellular standard, and/or the ISM band). The data network 36 may itself utilize cellular, WI-FI®, and/or BLUETOOTH® capability. The networking environment may utilize near-field (short distance) or far-field (long distance) techniques. The networking environment may operate using the radio-frequency domain and/or the Internet Protocol (IP) domain. The networking environment may even include a distributed computing network, such as the Internet (sometimes alternatively known as the "World Wide Web"), an intranet, a local-area network (LAN), and/or a wide-area network (WAN). The networking environment may include physical connections, such as USB cables, coaxial cables, copper wires, fiber optic lines, and/or hybrid-coaxial lines. Exemplary embodiments may utilize any portion of the electromagnetic spectrum. The concepts described herein may be applied to any wireless/wireline communications network, regardless of physical componentry, physical configuration, or communications standard(s).

Figure 6:
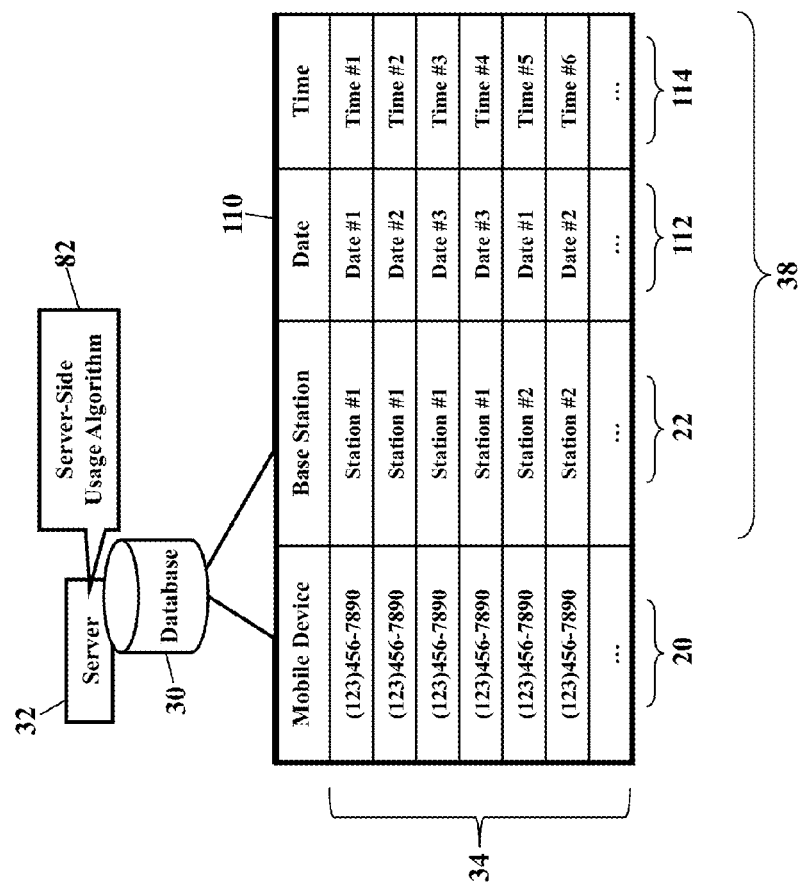
FIGS. 6-7 are diagrams further illustrating the database, according to exemplary embodiments.
Figure 7:
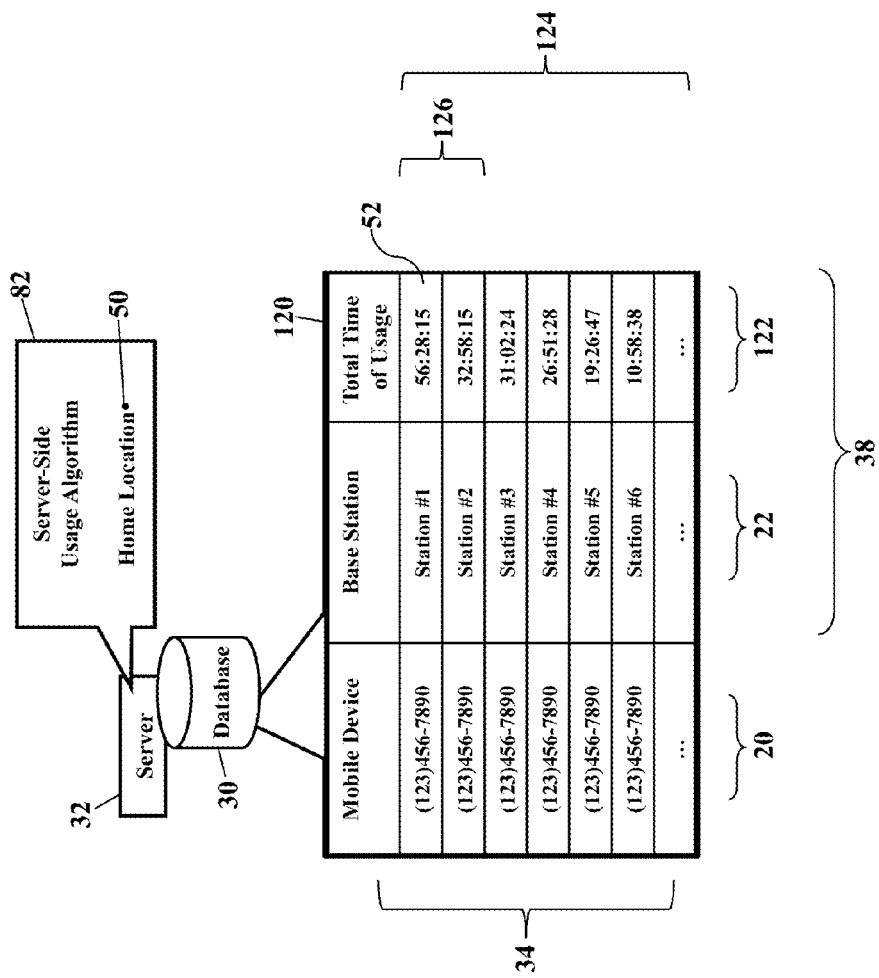

FIGS. 6-7 are diagrams further illustrating the database 30, according to exemplary embodiments. Over time the database 30 stores an historical record of the usage information 38 of the mobile device 20. The server-side usage algorithm 82 may thus summarize the usage information 38 to reveal the base stations 22 that are most used by the mobile device 20. The server-side usage algorithm 82, for example, may sort the usage information 38 according to the base station 22. That is, exemplary embodiments may arrange and/or group the usage information 38 for each individual base station 22. FIG. 6 only illustrates several entries, for simplicity. In practice, though, the database 30 may contain many entries, especially over months of recording.

FIG. 7 illustrates a summary view 120. Once the individual base station usages are sorted, the server-side usage algorithm 82 may then determine the sum total of usage for each different base station 22. FIG. 7, for example, illustrates a cumulative total time 122 of usage for each different base station 22. The date and time of each individual usage (illustrated, respectively, as reference numerals 112 and 114 in FIGS. 5-6) may be added together for each different base station 22. As FIG. 7 also illustrates, the server-side usage algorithm 82 may also rank 124 the total time 120 of usage for each different base station 22, such as arranging the entries in descending order.

The home location 50 may thus be revealed. Once the total time 122 of usage for each base station 22 is determined, exemplary embodiments thus reveal the base stations 22 that are most used by the mobile device 20. The user's home area may thus be associated with the base stations 22 having the greatest total times 122 of usage. Exemplary embodiments may thus select the higher-ranking base stations (illustrated as reference numeral 126) as the user's home location 50. Indeed, should one of the base stations 22 dominate the total time 122 of usage, the corresponding dominant base station 52 may be identified as the home location 50.

The home location 50 is now known. Once the higher-ranking base stations (illustrated as reference numeral 126) are known, and even the dominant base station 52, the user's geographical home location 50 is also known. A physical address of the dominant base station 52, for example, may be retrieved and assigned to the mobile device 20. The home location 50, however, may be generalized to some geographical region that is shared with the higher-ranking base stations 126 and/or the dominant base station 52. A postal zone (such as ZIP code) may be assigned as the home location 50 that matches the postal code of the dominant base station 52. The matching postal code may then be used with conventional advertising campaigns.

Figure 8:
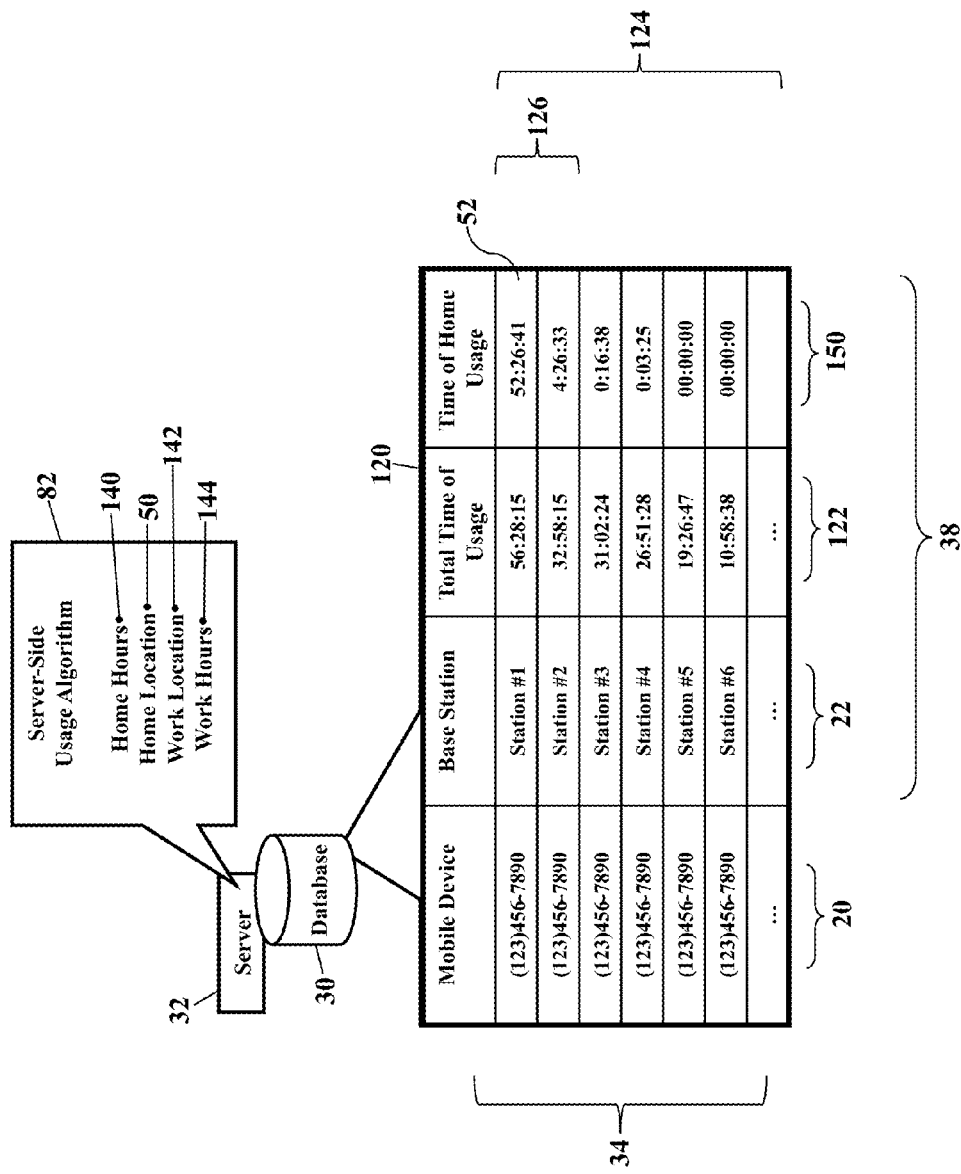
FIG. 8 is a diagram illustrating home hours, according to exemplary embodiments.

FIG. 8 is a diagram illustrating home hours 140, according to exemplary embodiments. Even though exemplary embodiments may determine the total time 122 of usage for each base station 22, daily habits may be considered. Most people have jobs that take them away from home. Indeed, most people work away from home for eight, ten, or more hours per day. If advertisers only want to target the home location 50, time spent at work may greatly skew the total time 122 of usage for some base stations 22. Some base stations 22, in other words, serve a work location 142 during work hours 144 that may be unrelated to the user's home location 50.

FIG. 8 thus illustrates a time 150 of home usage. This calculation summarizes the usage information 38 during home hours 140. Many people are home during the evening and nighttime hours (such 7 PM to 7 AM). Exemplary embodiments may then sort the transaction records 34 and only sum the usage information 38 for each base station 22 during the home hours 140. The server-side usage algorithm 82, for example, may query for, or filter, the transaction records 34 according to any window of time. Whatever the home hours 140, the server-side usage algorithm 82 may retrieve and analyze only the usage information 38 that matches or lies within the home hours 140.

Exemplary embodiment again reveal the home location 50. Once the time 150 of home usage, during the home hours 140, is determined for each base station 22, exemplary embodiments may perform the ranking 124. That is, the time 150 of home usage may be chronologically arranged to reveal the base stations 22 that are most used by the mobile device 20 during the home hours 140. The user's home area may thus be associated with the base stations 22 having the most home time usage information 38. Exemplary embodiments may thus select the higher-ranking base stations (illustrated as reference numeral 126) as the user's home location 50. As before, should one of the base stations 22 dominate the time 150 of home usage, the corresponding dominant base station 52 may be identified as the home location 50.

Figure 9:
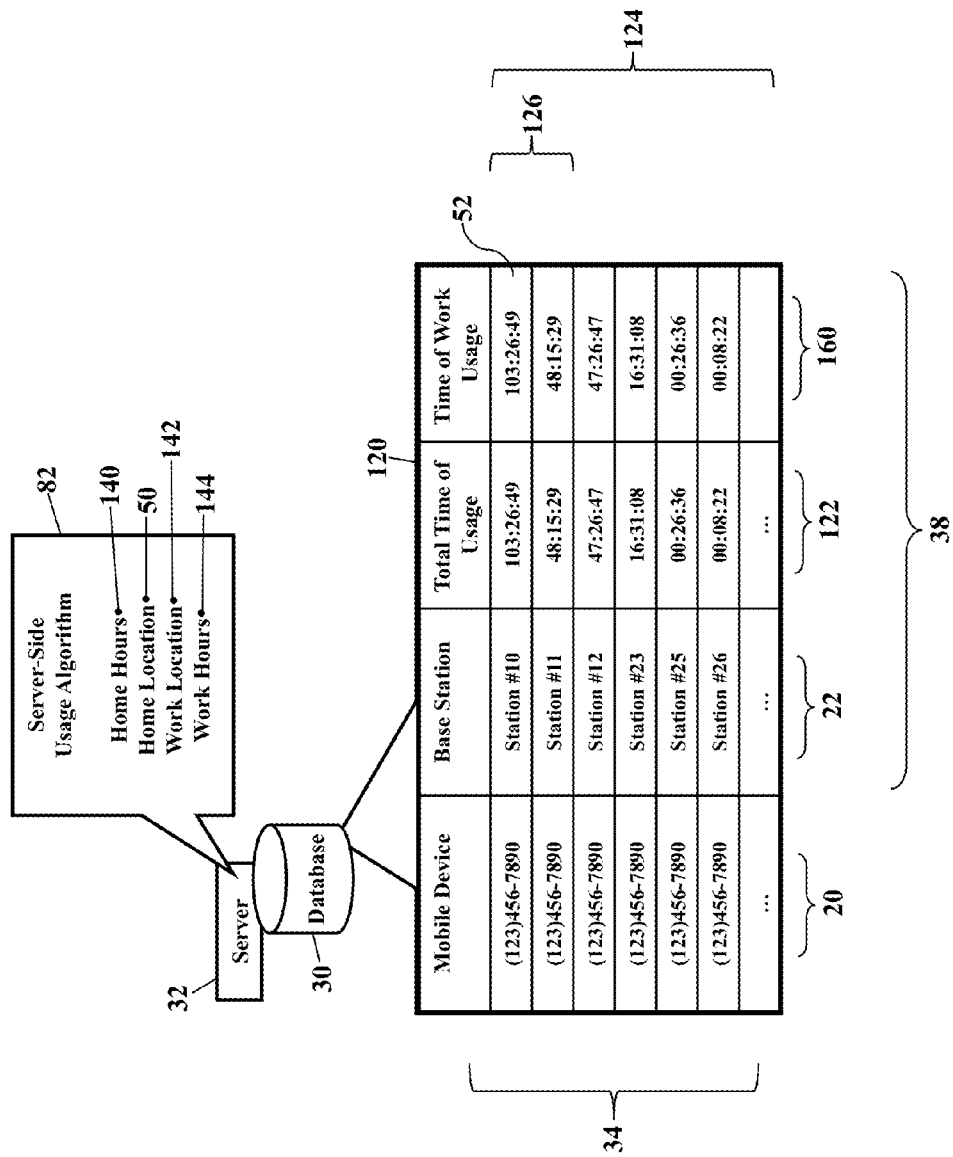
FIG. 9 is a schematic illustrating a time of work usage, according to exemplary embodiments.

FIG. 9 is a schematic illustrating a time 160 of work usage, according to exemplary embodiments. Just as the database 30 may reveal the user's home location (reference numeral 50, as explained above), exemplary embodiments may also reveal the user's work location 142. Exemplary embodiments may sort the transaction records 34 and sum the usage information 38, for each base station 22, during the work hours 144. The server-side usage algorithm 82, for example, may query for, or filter, the transaction records 34 according to the window of time from 7 AM to 7 PM. These hours may correspond to the work schedules of many users. The server-side usage algorithm 82 may rank 124 the time 160 of work usage, thus revealing the base stations 22 that are most used by the mobile device 20 during the work hours 144. The user's work location 142 may thus be associated with the base stations 22 having the higher-ranking time 160 of work usage (illustrated as reference numeral 126). As before, should one of the base stations 22 dominate the time 160 of work usage, the corresponding dominant base station 52 may be identified as the work location 142.

The work location 142 may then be used for targeted campaigns. Some advertisers may want their advertisements targeted to the work location 142. Exemplary embodiments may thus reveal the user's work location 142, based on the base stations 22 having frequent time 160 of work usage. Exemplary embodiments thus allow an advertiser to target mobile devices having the work location 142.

Exemplary embodiments may record usage of any network access point. As the mobile device 20 travels, the mobile device 20 may also access WI-FI® hotspot routers, BLUETOOTH® links, and other network access points. Exemplary embodiments may thus record the usage information 38 of any network access point encounter during the travel. Indeed, exemplary embodiments may report the transaction records 34 associated with any router, modem, switch, or any other access point. Exemplary embodiments may sort the transaction records 34 and sum the usage information 38, for each access point, during the home hours 140 and/or during the work hours 144. Exemplary embodiments may rank 124 the usage to reveal the user's home location 50 during the home hours 140. Exemplary embodiments may also rank 124 the time 160 of work usage to reveal the user's work location 142 during the work hours 144. Exemplary embodiments may thus sort and sum the usage of any access point.

Exemplary embodiments may utilize any statistical measurement. Even though total usages are explained, average usage may be determined for each base station 22 and each access point. Median usages may also be determined.

Figure 10:
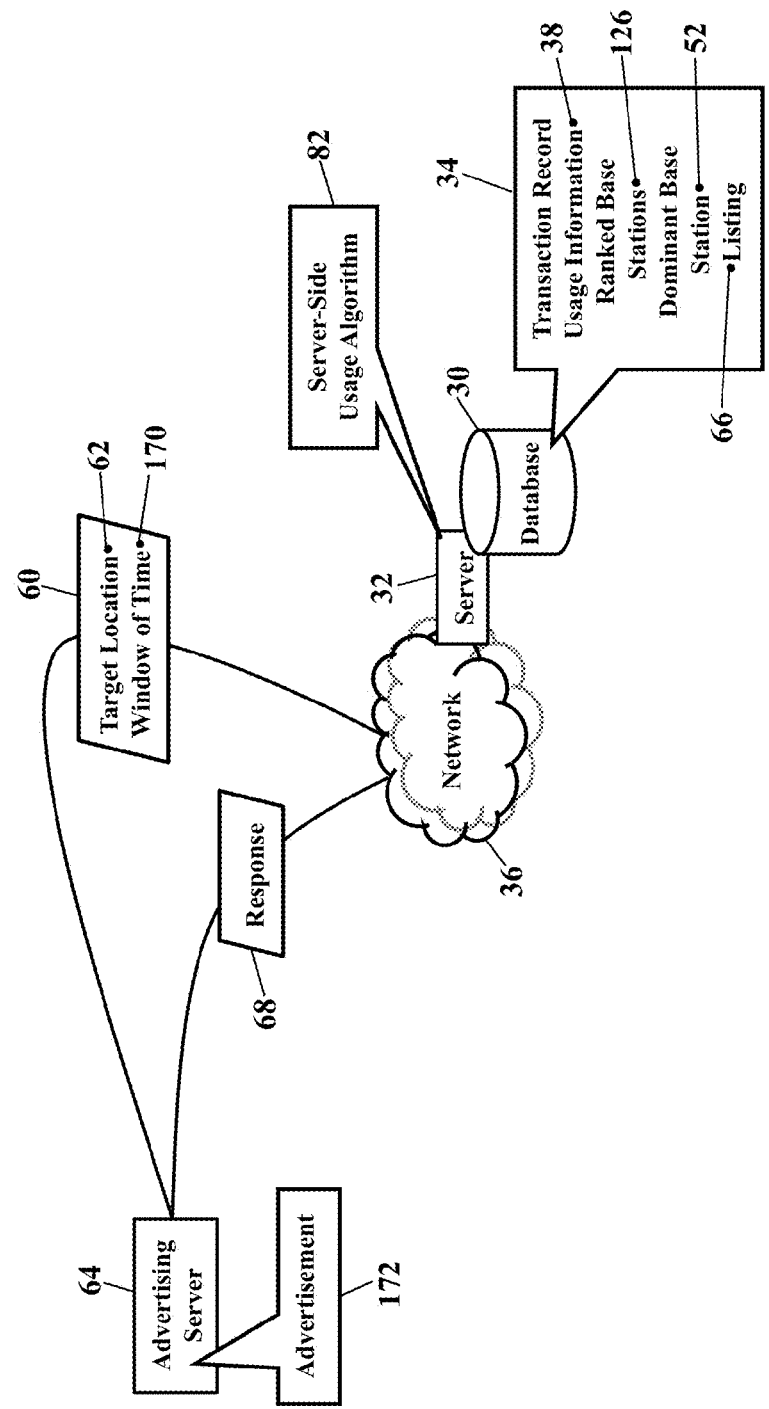
FIG. 10 is another schematic illustrating targeted advertising, according to exemplary embodiments.

FIG. 10 is another schematic illustrating targeted advertising, according to exemplary embodiments. Here, advertisers may request the ranked base stations 22 for any window 170 of time. That is, an advertisement 172 may be associated with any time of day, and exemplary embodiments determine the ranking base stations 22 for that time of day. As FIG. 10 illustrates, the server 32 receives the query 60 specifying the target location 62 for the window 170 of time. The query 60 requests the mobile devices having some affinity with the target location 62 during the window 170 of time. The server 32 queries the database 30 for the target location 62 and retrieves all the mobile devices 20 associated with the target location 62. Exemplary embodiments may further filter the results for the window 170 of time specified in the query 60. The server-side usage algorithm 82 may then generate the ranked base stations (illustrated as reference numeral 126) that are most used by each mobile device 20 during the window 170 of time. The server-side usage algorithm 82 sends the response 68. As before, the dominant base station 52 may be revealed.

Figure 11:
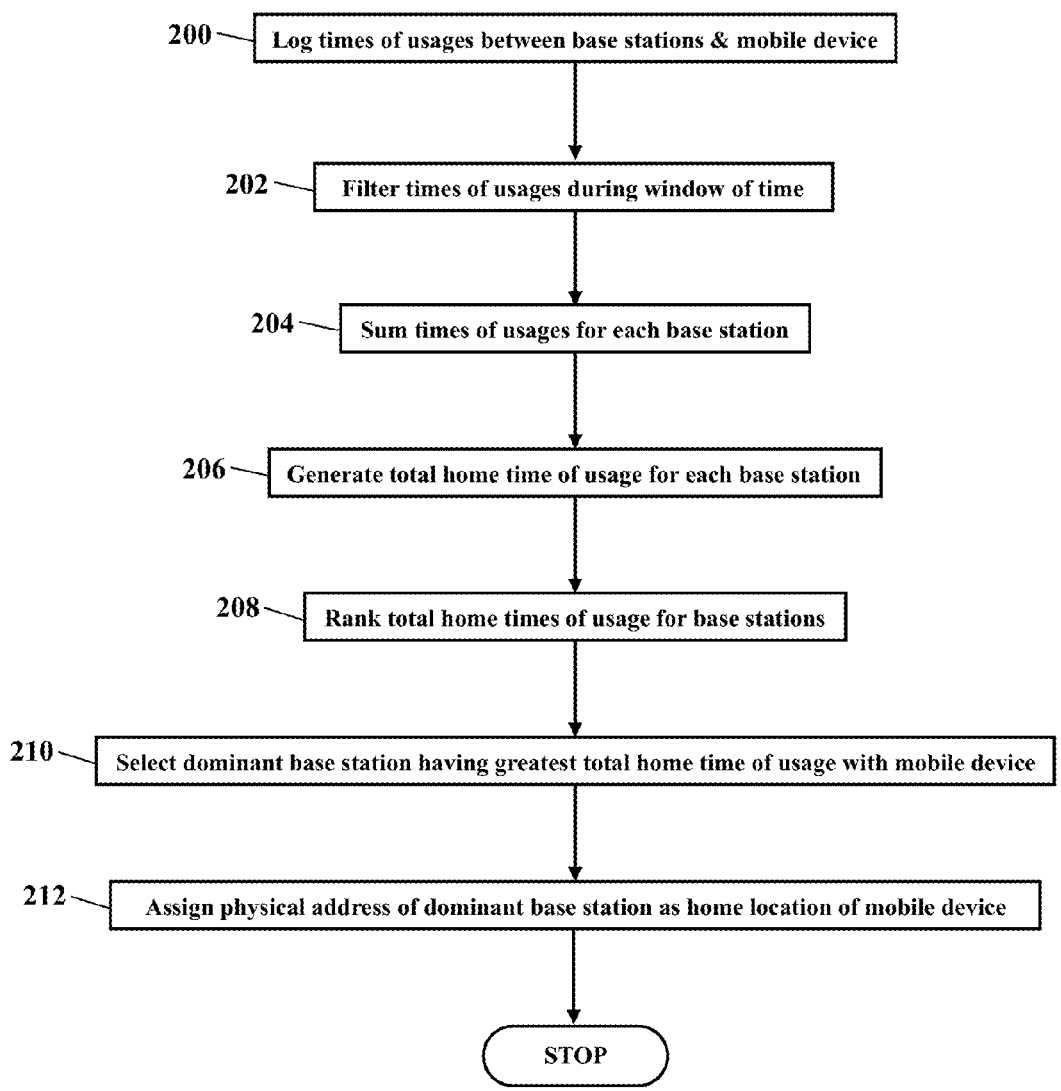
FIG. 11 is a flowchart illustrating a method or algorithm for determining the home location, according to exemplary embodiments.

FIG. 11 is a flowchart illustrating a method or algorithm for determining the home location 50, according to exemplary embodiments. Times of usages of base stations are logged for a mobile device (Block 200). The times of usages may be filtered during a window of time (such as home hours) (Block 202). The times of usages are summed (Block 204) to generate a total home time of usage for each one of the base stations (Block 206). The total home times of usage are ranked for all the base stations logging usage with the mobile device (Block 208). Select dominant base station having a greatest total home time of usage with the mobile device (Block 210). Assign a physical address of the dominant base station as the home location 50 of the mobile device (Block 212).

Figure 12:
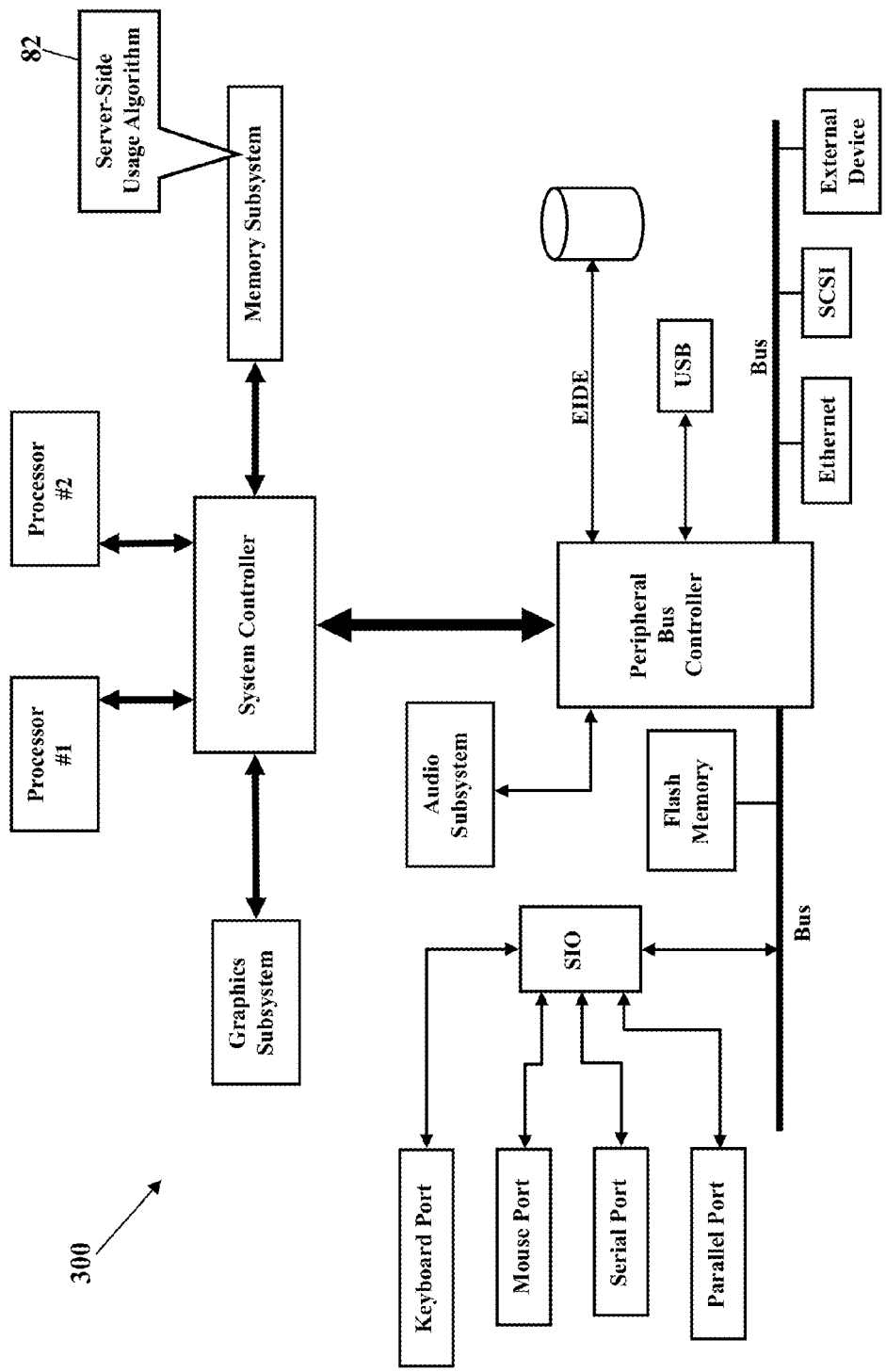
FIG. 12 depicts still more operating environments for additional aspects of the exemplary embodiments.

FIG. 12 is a schematic illustrating still more exemplary embodiments. FIG. 12 is a generic block diagram illustrating the server-side usage algorithm 82 operating within a processor-controlled device 300. As the above paragraphs explained, the server-side usage algorithm 82 may operate in any processor-controlled device 300. FIG. 12, then, illustrates the server-side usage algorithm 82 stored in a memory subsystem of the processor-controlled device 300. One or more processors communicate with the memory subsystem and execute the server-side usage algorithm 82. Because the processor-controlled device 300 illustrated in FIG. 12 is well-known to those of ordinary skill in the art, no detailed explanation is needed.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for determining home base stations, as explained above.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:

receiving, by a server, electronic transaction reports sent via a data network from cellular base stations, each electronic transaction report of the electronic transaction reports reporting a time of usage of a corresponding one of the cellular base stations to an identifier associated with a mobile device;

summing, by the server, times of usage reported by each one of the cellular base stations to generate a total time of usage associated with the each one of the cellular base stations, the total time of usage in an electronic association with the identifier associated with the mobile device;

determining, by the server, a dominant cellular base station of the cellular base stations based on the electronic transaction reports sent from the cellular base stations, the dominant cellular base station having a greatest total time of usage of all the cellular base stations utilized by the mobile device;

retrieving, by the server, a geographical location associated with the dominant cellular base station determined from the electronic transaction reports; and assigning, by the server, the geographical location associated with the dominant cellular base station as a residential home location associated with the identifier associated with the mobile device.

2. The method of claim 1, further comprising assigning a physical address associated with the dominant cellular base station to the residential home location.

3. The method of claim 2, further comprising assigning a postal code associated with the dominant cellular base station to the residential home location.

4. The method of claim 1, further comprising ranking the total time of usage associated with the cellular base stations.

5. The method of claim 1, further comprising sorting the times of usage associated with the cellular base stations.

6. The method of claim 1, further comprising receiving a query specifying a target location.

7. The method of claim 6, further comprising responding to the query with the geographical location associated with the dominant cellular base station.

8. A system, comprising:

a processor; and a memory device, the memory device storing instructions, the instructions when executed causing the processor to perform operations, the operations comprising:

receiving electronic transaction reports sent via a data network from cellular base stations, each electronic transaction report of the electronic transaction reports associating a time of usage of a corresponding one of the cellular base stations to an identifier associated with a mobile device;

summing times of usage reported by each one of the cellular base stations to generate a total time of usage associated with the each one of the cellular base stations, the total time of usage in an electronic association with the identifier associated with the mobile device;

determining a dominant cellular base station of the cellular base stations from the electronic transaction reports sent from the cellular base stations, the dominant cellular base station having a greatest total time of usage of all the cellular base stations utilized by the mobile device;

retrieving a geographical location associated with the dominant cellular base station determined from the electronic transaction reports; and assigning the geographical location associated with the dominant cellular base station as a residential home location associated with the mobile device.

9. The system of claim 8, wherein the operations further comprise assigning a physical address associated with the dominant cellular base station to the residential home location.

10. The system of claim 9, wherein the operations further comprise assigning a postal code associated with the dominant cellular base station to the residential home location.

11. The system of claim 8, wherein the operations further comprise ranking the total time of usage associated with the cellular base stations.

12. The system of claim 8, wherein the operations further comprise sorting the times of usage associated with the cellular base stations.

13. The system of claim 8, wherein the operations further comprise receiving a query specifying a target location.

14. The system of claim 13, wherein the operations further comprise responding to the query with the geographical location associated with the dominant cellular base station assigned to the residential home location.

15. A memory device storing instructions that, when executed by a processor, cause the processor to perform operations, the operations comprising:

receiving electronic transaction reports sent via a data network from cellular base stations, each electronic transaction report of the electronic transaction reports associating a time of usage of a corresponding one of the cellular base stations to an identifier associated with a mobile device;

summing times of usage reported by each one of the cellular base stations to generate a total time of usage associated with the each one of the cellular base stations, the total time of usage in an electronic association with the identifier associated with the mobile device;

determining a dominant cellular base station of the cellular base stations from the electronic transaction reports sent from the cellular base stations, the dominant cellular base station having a greatest total time of usage of all the cellular base stations utilized by the mobile device;

retrieving a geographical location associated with the dominant cellular base station determined from the electronic transaction reports; and assigning the geographical location associated with the dominant cellular base station as a residential home location associated with the mobile device.

16. The memory device of claim 15, wherein the operations further comprise querying a home location register for the geographical location associated with the dominant cellular base station having the greatest total time of usage.

17. The memory of device claim 15, wherein the operations further comprise assigning a physical address associated with the dominant cellular base station to the residential home location.

18. The memory of device claim 15, wherein the operations further comprise assigning a postal code associated with the dominant cellular base station to the residential home location of the mobile device.

19. The memory of device claim 15, wherein the operations further comprise ranking the total time of usage associated with the cellular base stations.

20. The memory of device claim 15, wherein the operations further comprise sorting the times of usage according to the cellular base stations.

* * * * *